United States Patent
Kliots Shapira et al.

(10) Patent No.: US 11,943,489 B2
(45) Date of Patent: *Mar. 26, 2024

(54) METHOD AND SYSTEM FOR AUTOMATIC REAL-TIME FRAME SEGMENTATION OF HIGH RESOLUTION VIDEO STREAMS INTO CONSTITUENT FEATURES AND MODIFICATIONS OF FEATURES IN EACH FRAME TO SIMULTANEOUSLY CREATE MULTIPLE DIFFERENT LINEAR VIEWS FROM SAME VIDEO SOURCE

(71) Applicants: Ela Kliots Shapira, Mattan (IL); Abraham Zvi Yehiel Elbaum, Petah-Tikva (IL)

(72) Inventors: Ela Kliots Shapira, Mattan (IL); Abraham Zvi Yehiel Elbaum, Petah-Tikva (IL)

(73) Assignee: Snakeview Data Science, Ltd., Rishon le Zion (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/817,202

(22) Filed: Aug. 3, 2022

(65) Prior Publication Data
US 2022/0377395 A1 Nov. 24, 2022

Related U.S. Application Data

(63) Continuation of application No. 16/973,739, filed as application No. PCT/IL2019/050141 on Feb. 6, 2019, now Pat. No. 11,445,227.

(Continued)

(51) Int. Cl.
*H04N 21/2343* (2011.01)
*G11B 27/036* (2006.01)
(Continued)

(52) U.S. Cl.
CPC ..... *H04N 21/23439* (2013.01); *G11B 27/036* (2013.01); *H04N 9/64* (2013.01);
(Continued)

(58) Field of Classification Search
CPC .... H04N 21/23439; H04N 11/24; H04N 9/64; H04N 21/236; H04N 21/8146; G11B 27/036
See application file for complete search history.

(56) References Cited

U.S. PATENT DOCUMENTS 6,189,064 B1   2/2001   Macinnis et al.
6,380,945 B1   4/2002   Macinnis et al.
(Continued)

FOREIGN PATENT DOCUMENTS

WO   WO 2008/039371   4/2008

OTHER PUBLICATIONS

Zitnick et al. "High-quality video view interpolation using a layered representation", ACM Transactions on Graphics (TOB), vol. 23, No. 3 (2004); retrieved from http://citeseerx.ist.psu.edu/viewdoc/download?doi=10.1.1.398.6681&rep=rep1&type=pdf.

(Continued)

*Primary Examiner* — Mishawn N. Hunter
(74) *Attorney, Agent, or Firm* — Wolter Van Dyke Davis, PLLC; Eugene J. Molinelli; Cian O'Brien

(57) ABSTRACT

A method, a programmed computer system, for example, a network-based hardware device, and a machine readable medium containing a software program for modifying a high definition video data stream in real time, with no visible delays, to add content on a frame by frame basis, thus simultaneously compositing multiple different customized linear views, for purposes such as creating and broadcasting targeted advertising in real time. The method employs conventional video processing technology in novel and (Continued)

inventive ways to achieve the desired objective by passing data selected by the program back and forth between a GPU and a CPU of a computer. The method is also usable with data streams having lower than high definition where real time processing is desired and yields better results than conventional methods. In such applications, all processing may be done by the CPU of a sufficiently powerful general-purpose computer.

20 Claims, 3 Drawing Sheets

Related U.S. Application Data

(60) Provisional application No. 62/683,654, filed on Jun. 12, 2018.

(51) Int. Cl.
*H04N 9/64* (2023.01)
*H04N 11/24* (2006.01)
*H04N 21/236* (2011.01)
*H04N 21/81* (2011.01)

(52) U.S. Cl.
CPC ........... *H04N 11/24* (2019.01); *H04N 21/236* (2013.01); *H04N 21/8146* (2013.01)

(56) References Cited

U.S. PATENT DOCUMENTS

| | | |
|---|---|---|
| 6,501,480 B1 | 12/2002 | Macinnis et al. |
| 6,529,935 B1 | 3/2003 | Macinnis et al. |
| 6,538,656 B1 | 3/2003 | Macinnis et al. |
| 6,570,579 B1 | 5/2003 | Macinnis et al. |
| 6,573,905 B1 | 6/2003 | Macinnis et al. |
| 6,608,630 B1 | 8/2003 | Macinnis et al. |
| 6,630,945 B1 | 10/2003 | Macinnis et al. |
| 6,636,222 B1 | 10/2003 | Macinnis et al. |
| 6,661,422 B1 | 12/2003 | Macinnis et al. |
| 6,661,427 B1 | 12/2003 | Macinnis et al. |
| 6,700,588 B1 | 3/2004 | Macinnis et al. |
| 6,721,837 B2 | 4/2004 | Macinnis et al. |
| 6,731,295 B1 | 5/2004 | Macinnis et al. |
| 6,738,072 B1 | 5/2004 | Macinnis et al. |
| 6,744,472 B1 | 6/2004 | Macinnis et al. |
| 6,762,762 B2 | 7/2004 | Macinnis et al. |
| 6,768,774 B1 | 7/2004 | Macinnis et al. |
| 6,771,196 B2 | 8/2004 | Macinnis et al. |
| 6,781,601 B2 | 8/2004 | Macinnis et al. |
| 6,798,420 B1 | 9/2004 | Macinnis et al. |
| 6,819,330 B2 | 11/2004 | Macinnis et al. |
| 6,853,385 B1 | 2/2005 | Macinnis et al. |
| 6,870,538 B2 | 3/2005 | Macinnis et al. |
| 6,879,330 B2 | 4/2005 | Macinnis et al. |
| 6,927,783 B1 | 8/2005 | Macinnis et al. |
| 6,944,746 B2 | 9/2005 | Macinnis et al. |
| 6,963,613 B2 | 11/2005 | Macinnis et al. |
| 6,975,324 B1 | 12/2005 | Macinnis et al. |
| 7,002,602 B2 | 2/2006 | Macinnis et al. |
| 7,007,031 B2 | 2/2006 | Macinnis et al. |
| 7,015,928 B2 | 3/2006 | Macinnis et al. |
| 7,034,897 B2 | 4/2006 | Macinnis et al. |
| 7,057,622 B2 | 7/2006 | Macinnis et al. |
| 7,071,944 B2 | 7/2006 | Macinnis et al. |
| 7,095,341 B2 | 8/2006 | Macinnis et al. |
| 7,096,245 B2 | 8/2006 | Macinnis et al. |
| 7,098,930 B2 | 8/2006 | Macinnis et al. |
| 7,110,006 B2 | 9/2006 | Macinnis et al. |
| 7,184,058 B2 | 2/2007 | Macinnis et al. |
| 7,209,992 B2 | 4/2007 | Macinnis et al. |
| 7,227,582 B2 | 6/2007 | Macinnis et al. |
| 7,256,790 B2 | 8/2007 | Macinnis et al. |
| 7,277,099 B2 | 10/2007 | Macinnis et al. |
| 7,302,503 B2 | 11/2007 | Macinnis et al. |
| 7,310,104 B2 | 12/2007 | Macinnis et al. |
| 7,365,752 B2 | 4/2008 | Macinnis et al. |
| 7,425,678 B2 | 9/2008 | Macinnis et al. |
| 7,427,713 B2 | 9/2008 | Macinnis et al. |
| 7,446,774 B1 | 11/2008 | Macinnis et al. |
| 7,476,804 B2 | 1/2009 | Adducci et al. |
| 7,485,803 B2 | 2/2009 | Macinnis et al. |
| 7,495,169 B2 | 2/2009 | Macinnis et al. |
| 7,498,512 B2 | 3/2009 | Macinnis et al. |
| 7,504,581 B2 | 3/2009 | Macinnis et al. |
| 7,530,027 B2 | 5/2009 | Macinnis et al. |
| 7,538,783 B2 | 5/2009 | Macinnis et al. |
| 7,545,438 B2 | 6/2009 | Macinnis et al. |
| 7,554,553 B2 | 6/2009 | Macinnis et al. |
| 7,554,562 B2 | 6/2009 | Macinnis et al. |
| 7,565,462 B2 | 7/2009 | Macinnis et al. |
| 7,592,541 B2 | 9/2009 | Macinnis et al. |
| 7,598,962 B2 | 10/2009 | Macinnis et al. |
| 7,608,779 B2 | 10/2009 | Macinnis et al. |
| 7,659,900 B2 | 2/2010 | Macinnis et al. |
| 7,667,135 B2 | 2/2010 | Macinnis et al. |
| 7,667,710 B2 | 2/2010 | Macinnis et al. |
| 7,667,715 B2 | 2/2010 | Macinnis et al. |
| 7,718,891 B2 | 5/2010 | Macinnis et al. |
| 7,746,354 B2 | 6/2010 | Macinnis et al. |
| 7,772,489 B2 | 8/2010 | Macinnis et al. |
| 7,781,675 B2 | 8/2010 | Macinnis et al. |
| 7,795,532 B2 | 9/2010 | Macinnis et al. |
| 7,848,430 B2 | 12/2010 | Macinnis et al. |
| 7,880,084 B2 | 2/2011 | Macinnis et al. |
| 7,881,385 B2 | 2/2011 | Macinnis et al. |
| 7,911,483 B1 | 3/2011 | Macinnis et al. |
| 7,912,220 B2 | 3/2011 | Macinnis et al. |
| 7,916,795 B2 | 3/2011 | Macinnis et al. |
| 7,920,151 B2 | 4/2011 | Macinnis et al. |
| 7,920,624 B2 | 4/2011 | Macinnis et al. |
| 7,966,613 B2 | 6/2011 | Macinnis et al. |
| 7,982,740 B2 | 7/2011 | Macinnis et al. |
| 7,991,049 B2 | 8/2011 | Macinnis et al. |
| 8,005,147 B2 | 8/2011 | Macinnis et al. |
| 8,022,966 B2 | 9/2011 | Macinnis et al. |
| 8,024,389 B2 | 9/2011 | Macinnis et al. |
| 8,078,981 B2 | 12/2011 | Macinnis et al. |
| 8,164,601 B2 | 4/2012 | Macinnis et al. |
| 8,165,155 B2 | 4/2012 | Macinnis et al. |
| 8,171,500 B2 | 5/2012 | Macinnis et al. |
| 8,189,678 B2 | 5/2012 | Macinnis et al. |
| 8,199,154 B2 | 6/2012 | Macinnis et al. |
| 8,229,002 B2 | 7/2012 | Macinnis et al. |
| 8,237,052 B2 | 8/2012 | Macinnis et al. |
| 8,284,844 B2 | 10/2012 | Macinnis et al. |
| 8,390,635 B2 | 3/2013 | Macinnis et al. |
| 8,395,046 B2 | 3/2013 | Macinnis et al. |
| 8,401,084 B2 | 3/2013 | Macinnis et al. |
| 8,493,415 B2 | 7/2013 | Macinnis et al. |
| 8,659,608 B2 | 2/2014 | Macinnis et al. |
| 8,698,838 B1 | 4/2014 | Masterson |
| 8,802,978 B2 | 8/2014 | Macinnis et al. |
| 8,848,792 B2 | 9/2014 | Macinnis et al. |
| 8,850,078 B2 | 9/2014 | Macinnis et al. |
| 8,863,134 B2 | 10/2014 | Macinnis et al. |
| 8,913,667 B2 | 12/2014 | Macinnis et al. |
| 8,942,295 B2 | 1/2015 | Macinnis et al. |
| 8,989,263 B2 | 3/2015 | Macinnis et al. |
| 9,053,752 B1 | 6/2015 | Masterson |
| 9,077,997 B2 | 7/2015 | Macinnis et al. |
| 9,104,424 B2 | 8/2015 | Macinnis et al. |
| 9,111,369 B2 | 8/2015 | Macinnis et al. |
| 9,307,236 B2 | 4/2016 | Macinnis et al. |
| 9,329,871 B2 | 5/2016 | Macinnis et al. |
| 9,417,883 B2 | 8/2016 | Macinnis et al. |
| 9,575,665 B2 | 2/2017 | Macinnis et al. |
| 9,668,011 B2 | 5/2017 | Macinnis et al. |
| 2002/0093517 A1 | 7/2002 | Macinnis et al. |
| 2002/0106018 A1 | 8/2002 | Macinnis et al. |
| 2002/0145613 A1 | 10/2002 | Macinnis et al. |
| 2003/0117406 A1 | 6/2003 | Macinnis et al. |
| 2003/0158987 A1 | 8/2003 | Macinnis et al. |

(56) References Cited

U.S. PATENT DOCUMENTS

| | | |
|---|---|---|
| 2003/0189571 A1 | 9/2003 | Macinnis et al. |
| 2003/0184457 A1 | 10/2003 | Macinnis et al. |
| 2003/0185298 A1 | 10/2003 | Macinnis et al. |
| 2003/0185305 A1 | 10/2003 | Macinnis et al. |
| 2003/0185306 A1 | 10/2003 | Macinnis et al. |
| 2003/0187824 A1 | 10/2003 | Macinnis et al. |
| 2003/0187895 A1 | 10/2003 | Macinnis et al. |
| 2003/0188127 A1 | 10/2003 | Macinnis et al. |
| 2003/0189982 A1 | 10/2003 | Macinnis et al. |
| 2003/0206174 A1 | 11/2003 | Macinnis et al. |
| 2003/0235251 A1 | 12/2003 | Macinnis et al. |
| 2004/0017398 A1 | 1/2004 | Macinnis et al. |
| 2004/0028141 A1 | 2/2004 | Macinnis et al. |
| 2004/0047194 A1 | 3/2004 | Macinnis et al. |
| 2004/0056864 A1 | 3/2004 | Macinnis et al. |
| 2004/0056874 A1 | 3/2004 | Macinnis et al. |
| 2004/0130558 A1 | 7/2004 | Macinnis et al. |
| 2004/0150652 A1 | 8/2004 | Macinnis et al. |
| 2004/0169660 A1 | 9/2004 | Macinnis et al. |
| 2004/0177190 A1 | 9/2004 | Macinnis et al. |
| 2004/0177191 A1 | 9/2004 | Macinnis et al. |
| 2004/0208245 A1 | 10/2004 | Macinnis et al. |
| 2004/0212730 A1 | 10/2004 | Macinnis et al. |
| 2004/0212734 A1 | 10/2004 | Macinnis et al. |
| 2004/0246257 A1 | 12/2004 | Macinnis et al. |
| 2005/0007264 A1 | 1/2005 | Macinnis et al. |
| 2005/0012759 A1 | 1/2005 | Macinnis et al. |
| 2005/0024369 A1 | 2/2005 | Macinnis et al. |
| 2005/0044175 A1 | 2/2005 | Macinnis et al. |
| 2005/0122335 A1 | 6/2005 | Macinnis et al. |
| 2005/0123057 A1 | 6/2005 | Macinnis et al. |
| 2005/0122341 A1 | 7/2005 | Macinnis et al. |
| 2005/0160251 A1 | 7/2005 | Macinnis et al. |
| 2005/0168480 A1 | 8/2005 | Macinnis et al. |
| 2005/0177845 A1 | 8/2005 | Macinnis et al. |
| 2005/0231526 A1 | 10/2005 | Macinnis et al. |
| 2006/0002427 A1 | 1/2006 | Macinnis et al. |
| 2006/0056517 A1 | 3/2006 | Macinnis et al. |
| 2006/0193383 A1 | 8/2006 | Macinnis et al. |
| 2006/0197771 A1 | 9/2006 | Macinnis et al. |
| 2006/0262129 A1 | 11/2006 | Macinnis et al. |
| 2006/0268012 A1 | 11/2006 | Macinnis et al. |
| 2006/0280374 A1 | 12/2006 | Macinnis et al. |
| 2006/0290708 A1 | 12/2006 | Macinnis et al. |
| 2007/0005795 A1 | 1/2007 | Gonzalez |
| 2007/0030276 A1 | 2/2007 | Macinnis et al. |
| 2007/0089114 A1 | 4/2007 | Macinnis et al. |
| 2007/0103489 A1 | 5/2007 | Macinnis et al. |
| 2007/0120874 A1 | 5/2007 | Macinnis et al. |
| 2007/0210679 A1 | 9/2007 | Macinnis et al. |
| 2007/0210680 A1 | 9/2007 | Macinnis et al. |
| 2007/0210681 A1 | 9/2007 | Macinnis et al. |
| 2007/0210683 A1 | 9/2007 | Macinnis et al. |
| 2007/0210686 A1 | 9/2007 | Macinnis et al. |
| 2007/0217518 A1 | 9/2007 | Macinnis et al. |
| 2007/0221393 A1 | 9/2007 | Macinnis et al. |
| 2007/0285440 A1 | 12/2007 | Macinnis et al. |
| 2008/0036339 A1 | 2/2008 | Macinnis et al. |
| 2008/0036340 A1 | 2/2008 | Macinnis et al. |
| 2008/0067903 A1 | 3/2008 | Macinnis et al. |
| 2008/0067904 A1 | 3/2008 | Macinnis et al. |
| 2008/0074012 A1 | 3/2008 | Macinnis et al. |
| 2008/0074849 A1 | 3/2008 | Macinnis et al. |
| 2008/0077953 A1 | 3/2008 | Fernandez |
| 2008/0079340 A1 | 4/2008 | Macinnis et al. |
| 2008/0094416 A1 | 4/2008 | Macinnis et al. |
| 2008/0094506 A1 | 4/2008 | Macinnis et al. |
| 2008/0133786 A1 | 6/2008 | Macinnis et al. |
| 2008/0174217 A1 | 7/2008 | Macinnis et al. |
| 2009/0066724 A1 | 3/2009 | Macinnis et al. |
| 2009/0128572 A1 | 5/2009 | Macinnis et al. |
| 2009/0134750 A1 | 5/2009 | Macinnis et al. |
| 2009/0150923 A9 | 6/2009 | Macinnis et al. |
| 2009/0282172 A1 | 11/2009 | Macinnis et al. |
| 2009/0295815 A1 | 12/2009 | Macinnis et al. |
| 2009/0295834 A1 | 12/2009 | Macinnis et al. |
| 2010/0103195 A1 | 4/2010 | Macinnis et al. |
| 2010/0110106 A1 | 5/2010 | Macinnis et al. |
| 2010/0171761 A1 | 7/2010 | Macinnis et al. |
| 2010/0171762 A1 | 7/2010 | Macinnis et al. |
| 2010/0219726 A1 | 9/2010 | Macinnis et al. |
| 2010/0238994 A1 | 9/2010 | Cakareski |
| 2010/0264788 A1 | 10/2010 | Macinnis et al. |
| 2011/0063415 A1 | 3/2011 | Gefen |
| 2011/0084580 A1 | 4/2011 | Macinnis et al. |
| 2011/0122941 A1 | 5/2011 | Macinnis et al. |
| 2011/0173612 A1 | 7/2011 | Macinnis et al. |
| 2011/0188580 A1 | 8/2011 | Macinnis et al. |
| 2011/0193868 A1 | 8/2011 | Macinnis et al. |
| 2011/0234618 A1 | 9/2011 | Macinnis et al. |
| 2011/0273476 A1 | 11/2011 | Macinnis et al. |
| 2011/0280307 A1 | 11/2011 | Macinnis et al. |
| 2011/0292074 A1 | 12/2011 | Macinnis et al. |
| 2011/0292082 A1 | 12/2011 | Macinnis et al. |
| 2012/0020412 A1 | 1/2012 | Macinnis et al. |
| 2012/0087593 A1 | 4/2012 | Macinnis et al. |
| 2012/0093215 A1 | 4/2012 | Macinnis et al. |
| 2012/0191879 A1 | 7/2012 | Macinnis et al. |
| 2012/0267991 A1 | 10/2012 | Macinnis et al. |
| 2012/0268655 A1 | 10/2012 | Macinnis et al. |
| 2012/0328000 A1 | 12/2012 | Macinnis et al. |
| 2013/0022105 A1 | 1/2013 | Macinnis et al. |
| 2013/0195175 A1 | 8/2013 | Macinnis et al. |
| 2014/0078155 A1 | 3/2014 | Macinnis et al. |
| 2014/0207644 A1 | 7/2014 | Lutnick et al. |
| 2015/0317085 A1 | 11/2015 | Macinnis et al. |
| 2016/0364490 A1 | 12/2016 | Maugans, III |
| 2016/0364736 A1 | 12/2016 | Maugans, III |
| 2016/0364762 A1 | 12/2016 | Maugans, III |
| 2016/0364767 A1 | 12/2016 | Maugans, III |
| 2018/0239472 A1 | 5/2018 | Shaw et al. |
| 2018/0176607 A1 | 6/2018 | Shaw et al. |
| 2018/0184133 A1 | 6/2018 | Shaw et al. |
| 2018/0184138 A1 | 6/2018 | Shaw et al. |
| 2018/0199082 A1 | 7/2018 | Shaw et al. |
| 2018/0220165 A1 | 8/2018 | Shaw et al. |
| 2019/0110096 A1 | 4/2019 | Shaw et al. |
| 2019/0370831 A1 | 12/2019 | Maugans, III |
| 2020/0410515 A1 | 12/2020 | Maugans, III |

OTHER PUBLICATIONS

International Search Report dated May 23, 2019 issued in International Application No. PCT/IL2019/050141.
Written Opinion dated May 23, 2019 issued in International Application No. PCT/IL2019/050141.
Supplementary European Search Report dated Apr. 19, 2021 issued in European Application No. EP 19 82 0352.

METHOD AND SYSTEM FOR AUTOMATIC REAL-TIME FRAME SEGMENTATION OF HIGH RESOLUTION VIDEO STREAMS INTO CONSTITUENT FEATURES AND MODIFICATIONS OF FEATURES IN EACH FRAME TO SIMULTANEOUSLY CREATE MULTIPLE DIFFERENT LINEAR VIEWS FROM SAME VIDEO SOURCE

CROSS REFERENCE TO RELATED APPLICATIONS

This application is a Divisional of U.S. patent application Ser. No. 16/973,739 filed Dec. 9, 2020, which is a U.S. National Stage Application of International Application No. PCT/IL2019/050141, filed Feb. 6, 2019, which claims the benefit of priority of U.S. Provisional Application No. 62/683,654, filed Jun. 12, 2018, all of the foregoing are hereby incorporated by reference in their entireties.

FIELD OF THE INVENTION

The present invention, in some embodiments thereof, relates to processing of high definition video data, and more particularly, but not exclusively, to apparatus and methods for modifying one or more high definition video data streams on a frame-by-frame basis to add content thereto by extracting color mapping information from high-resolution frames and performing frame modification at the level of the extracted color maps, to simultaneously create multiple different synchronized linear views from the same original video stream source(s), while keeping the source(s) intact for future use. The invention also relates to non-volatile machine-readable media containing software for implementing the other aspects of the invention.

The invention has various applications, but will be described in the specific contexts of systems and methods for adding additional content, for example, targeted advertising, to high definition video data streams on a frame-by-frame basis in real time, i.e., within the presentation duration of the individual frames.

For purposes of the discussion herein, image resolution, including video frame resolution, is considered high when it is at least HD resolution of 1920 pixels×1080 lines (2.1 megapixels, aspect ratio 16:9).

BACKGROUND OF THE INVENTION

Computerized video creation and editing, and live video transmission are well-established and mature technologies in many respects. Commercially available applications and related support such as Videolicious® available from Videolicious, Inc. of New York City and OBS Studio, an open source system, permit live, real time creation of video streams from multiple sources. In that respect, it is an alternative to post production editing followed by delayed transmission. Other applications that permit creating composite video streams, even using smart phones as the input source also exist.

Graphical processing methods and video editing programs capable of segmentation of frames into their constituent features are also known in the art. Such frame processing methods rely on calculations of relations between pixels, which are done by the central processing unit (CPU) and a Graphics Processing Unit (GPU) of an appropriately programmed computer. Color segmentation is one such constituent feature, See, for example, Zitnick, et al., *High-quality Video View Interpolation Using a Layered Representation*, an application for viewer viewpoint control of live video streams developed by the Interactive Visual Media Group, Microsoft Research, of Redmond, WA.

However, known methods require substantial computational time, which increases exponentially according to frame size, making these methods unsuitable for real-time frame processing of high-resolution video streams, in particular on low-power electronic devices.

Also known, are video-editing programs capable of pixel modification of a preselected area in a frame. Such frame processing methods apply selected frame processes sequentially, applying each consecutive modification to the result of its predecessor. However, this process requires manual editing and compositing of each frame in the video using the program, which is a long and expensive post-production professional process.

Also known, are streaming servers which re-stream video while performing the same frame modifications to all outgoing streams, and television editing tables and other specially designed equipment for broadcasting video which perform the same.

Also known, are TV set-top-boxes and internet-protocol-based players which can overlay graphics for the viewer to create a unified video view.

There are, however, no prior art solutions known to the inventors hereof that provide for real-time high-resolution frame content modification based on frame segmentation or any other strategy to produce multiple differently customized videos synchronously, from the same input video stream(s), at the broadcasting source. The present invention seeks to meet this need and represents a significant improvement in computer functionality for video stream editing applications.

SUMMARY OF THE INVENTION

According to an aspect of some embodiments of the invention, there is provided method of modifying high resolution video data in real time using a computer including a GPU. The method involves receiving the video data stream by the computer, extracting color data for the individual pixels of the frames of the video data stream to create color layers, cascading the color layers into a unified color map of features in the frame, assembling pixel modification instructions from stored data according to predefined instructions, creating one or more modified sets of video data streams according to the pixel modification instructions, output resolution requirements, and desired file formats, while the original source remains intact. and making the modified video data available for access by one or more intended recipients.

According to some embodiment, the video data is in the form of a video stream provided by any source and in any native format, including a digital camera, a recorded video file, a streaming video file obtained over the internet, and a commercial video program obtained directly off-the-air.

According to some embodiments, the received video data stream is decoded from its native format, if necessary, to the internal processing format employed by the computer.

According to some embodiments, the pixel modification instructions include modifications of color of the original data. According to some embodiments, the pixel modification instructions include additional graphical data to be composited with the original graphical data.

According to some embodiments, the additional graphical data can be video data from any source and in any native format which has been decoded, from its native format, if necessary, to the internal processing format employed by the computer performing the method. According to some embodiments, additional graphical data may include images, definitions of 3D models, and definitions of text to be rendered by the GPU of the computer.

According to some embodiments the pixel modification instructions transmitted to the GPU include instructions for adding (compositing) graphical elements. According to some embodiments, the pixel modification instructions include storyboard script created prior to processing of the video stream and read during processing, and/or commands sent to the system from a human user during processing. According to some embodiments, the pixel modification instructions are generated automatically by a computer algorithm external to the computer performing the method.

According to some embodiments, part of frame, or a whole frame, as color layers, is transferred from the GPU to the CPU of the computer for processing by the external computer program, wherein the external program is one of a computer vision algorithms and a business-intelligence algorithm. According to some embodiments, the color layers which will be transferred to the CPU for subsequent processing by the external computer program undergo specific processing by the GPU prior to transfer, to prepare them for external logic application.

According to some embodiments of the invention, the method further involves executing a self-calibrating routine by accessing succeeding video frames to reduce sensitivity to detection of irrelevant changes in the video data.

According to some embodiments, the results of external processing are used to automatically generate pixel modification instructions. According to some embodiments, the pixel modification instructions for the color layers, including additional graphical elements, are transmitted to the GPU based on stored data for each intended recipient of each modified video stream.

According to some embodiments, the pixel modification instructions for the color layers include data provided by external systems for each intended recipient of each modified video stream. According to some embodiments, the one or more modified video data streams are created by merging the originally segmented color layers and the added graphical components into a series of single-layer color frames with uniform resolution, one per discrete set of instructions, rendering each single-layer color frame in one or more resolutions, as required by intended recipients, to create final frames, encoding, per resolution, each final frame to one or more codecs to create video components, and multiplexing, per video component, video and audio components into one or more different container files.

According to an aspect of the invention, each frame is modified without introducing visible delays to the modified output streams even for high definition video data streams, the multiple differently modified video data streams are created simultaneously and made available to multiple users, and all created modified video data streams which are based on the same original video data stream are synchronized with respect to the original video's timeline.

21. According to some embodiments, the incoming video data stream is characterized by lower than high definition, and all the processing steps are performed by the CPU and active memory of a computer without utilization of a GPU.

A according to an aspect of some embodiments of the invention, there is provide computer system having one or more central processing units, one or more graphics processing units, one or more network or other communication interface units, a shared memory including mass storage capability in which there is installed a program for performing a method as described above. According to some embodiments, the graphic processing functions are performed by a GPU or by a CPU operating in a parallel processing mode.

A according to a further aspect of some embodiments of the invention, there is provided a computer readable medium containing a computer program operable to perform the method as described above

BRIEF DESCRIPTION OF THE DRAWINGS

Some embodiments of the invention are described below, by way of example only, with reference to the accompanying drawings. It is, however, to be recognized that the particulars shown are by way of example only and for purposes of illustrative discussion of embodiments of the invention. In this regard, the description taken with the drawings makes apparent to those skilled in the art how embodiments of the invention may be practiced.

In the drawings.

DETAILED DESCRIPTION OF AT LEAST ONE EMBODIMENT OF THE INVENTION

Figure 1:
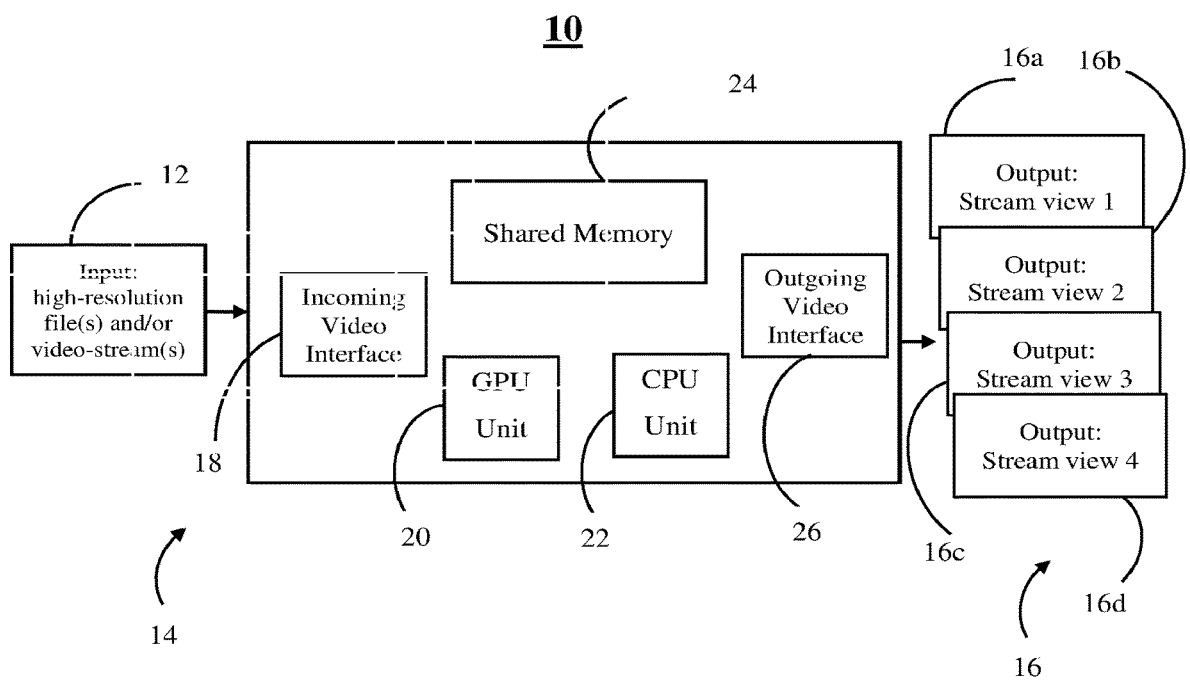
FIG. 1 is a block diagram of a computer system providing the functionality of the present invention according to some embodiments thereof.

Introductory Overview:

The present invention, in some embodiments thereof, relates to processing of high definition video data and, more particularly, but not exclusively, to apparatus and methods for modifying one or more high definition video data streams on a frame-by-frame basis to add content thereto by extracting color mapping information from high-resolution frames and performing frame modification at the level of the extracted color maps, to simultaneously create multiple different synchronized linear views from the same original video stream source(s), while keeping the source(s) intact for future use. The invention also relates to non-volatile machine-readable media containing software for implementing the other aspects of the invention.

The invention has a variety of applications but will be described by way of example in the specific contexts of systems and methods for adding additional content, for example, targeted advertising to high definition video data streams on a frame-by-frame basis in real time, i.e., within the presentation duration of the individual frames.

The method according to the invention can also be used for improved real-time modification of video data on a frame by frame basis where high definition as defined above is not needed.

In simplest terms, the present invention uses an application software program to modify the individual pixels in a video data stream within the individual frames based on feature segmentation. According to an aspect of the invention, the feature upon which the segmentation is based is pixel color. According to some embodiments, the segmentation is performed by a GPU under control of the programming and the CPU of a conventional microprocessor-controlled computer.

More particularly, the present invention addresses the problem that processing of increasingly higher resolution images requires an exponential increase of computing power, so it is impossible to perform the described graphic modifications in real-time on UHD frames on a CPU alone, such that multiple different synchronized views are created simultaneously, based on the same source with different added graphical elements. While it is possible to perform graphic modifications in real time on HD frames, even this requires a very powerful CPU not typically found in most computers.

According to an aspect of the invention, the different modifications are done simultaneously to create multiple different views. According to some embodiments of the invention, the different modified video views can be immediately broadcasted to different viewers. According to some embodiments of the invention, the different modified video views can be saved as files. According to an aspect of the invention, the original video source(s) data remains intact and can be reused.

According to an aspect of the invention, there is provided a programming model for a general-purpose computer which significantly improves its functionality in real-time processing of a video stream and frame-by-frame modification of the video stream according to selectable criteria.

According to some embodiments, the criteria comprise the identity of the intended recipient of the modified video stream.

According to some embodiments, the modification to the video data comprises targeted advertising. Such targeted advertising can be based on collected demographic information about the recipient and/or derived from a computer readable medium or information stored in the host computer.

According to some embodiments, the modification instructions can be derived from what is known in the art as a "storyboard script", i.e., a program written prior to processing and read during processing, and commands, include the definition of the added graphical content.

According to some embodiments, the content of the advertising is determined by a human user, as part of the initial configuration of the system or in real-time during processing and broadcasting.

According to other embodiments, the added content may be determined by an external system or organization, which makes such determinations by processing available data about the intended recipient. The content of the advertising can also be determined by non-human, business intelligence and artificial-intelligence systems, which analyze available recipient data and make decisions based on their algorithms.

According to some embodiments, the programming operates the computer to automatically create color-based segmentation of a high-resolution video stream in real time, whereby the video stream can be modified according to one or more predetermined criteria to add desired modifications to each frame at the level of the color-based segments, within timeframe limits of a real-time video stream.

According to some embodiments, the program includes a plurality of definitions of frame modifications, a list of mathematical functions, which implements the aforementioned modifications, rules for optimization of the mathematical functions and rules for application of the mathematical functions to assemble the respective frame modifications. The rules for assembly of the mathematical functions are configured to assemble all relevant mathematical functions, in a cascading manner, into a single composite process.

As used herein, "cascading manner into a single composite process" means that the mathematical functions are arranged so the input of consecutive functions is the output of their respective predecessors, so the assembly of mathematical functions becomes a single calculation which is easily optimized by a common routine performed by a GPU, as opposed to list of discrete functions to be applied one after another.

According to a further aspect of the invention, there is provided a non-volatile machine-readable medium, containing programming instructions for operating a computer to modify a video data stream in real time to insert selected content therein on a frame by frame basis. According to some embodiments, the programming instructions implement the image processing functions described above.

According to a further aspect of the invention, there is provided a method of modifying a video data stream in real time to add selected content thereto on a frame by frame basis. According to some embodiments, the method implements the image processing functions described above.

According to yet a further aspect of the invention, there is provided a method of synchronizing the creation of different views which are based on the same source, such that while the views differ in file format, resolution, and/or graphic modifications, they do not differ in timeline with respect to the original source.

DESCRIPTION OF AN ILLUSTRATIVE EMBODIMENT

Referring to FIG. 1, there is shown a block diagram of a preferred system, generally denoted at 10, for implementing some embodiments of the invention. The system includes one or more input sources 12 for one or more high resolution (HD or higher) video files, a microprocessor-controlled computer system generally designated at 14, and an output interface, generally indicated at 16. Input sources 12 can be a digital camera, a recorded video file, a streaming video file obtained over the internet or a commercial video program obtained directly off-the-air.

Computer system 14 may be of conventional architecture and comprised of conventional components but is programmed according to the invention to provide a technical solution resulting in enhanced functionality as described herein not achievable by previously known methods and systems.

One particularly advantageous application of the invention is the processing of HD or higher resolution video files, in real time, to embed into a succession of frames thereof, additional information, e.g., an advertising message, that can be targeted specifically toward individual recipients or groups of recipients sharing common interests or other characteristics. Accordingly, output interface 16 provides multiple synchronized targeted output video streams, by way of example, four being shown at 16a-16d.

Structurally, computer system 14 may be of any type suitable for high-speed video processing. In some exemplary embodiments, such a system may include an incoming video input interface 18, such as network interface circuitry or video card, which receives the incoming video signal from source 12, a graphics processing unit (GPU) 20, a central processing unit (CPU) 22, a shared high-speed memory 24 which will typically include mass storage capability, and an outgoing video output interface unit 26 which provides the multiple outgoing video stream 16a, 16b, etc.

The video stream may be derived from any known or hereafter developed source, for example, a server, a digital camera, a mobile hand-held devices (smartphones), phablets, tablets, off the air television broadcasts, streaming video provided over the internet or video programming stored on a user's personal computer.

The modified output video stream may be directed to any of the kinds of destinations described above as sources of the original video data, as will be understood by those skilled in the art.

Figure 2:
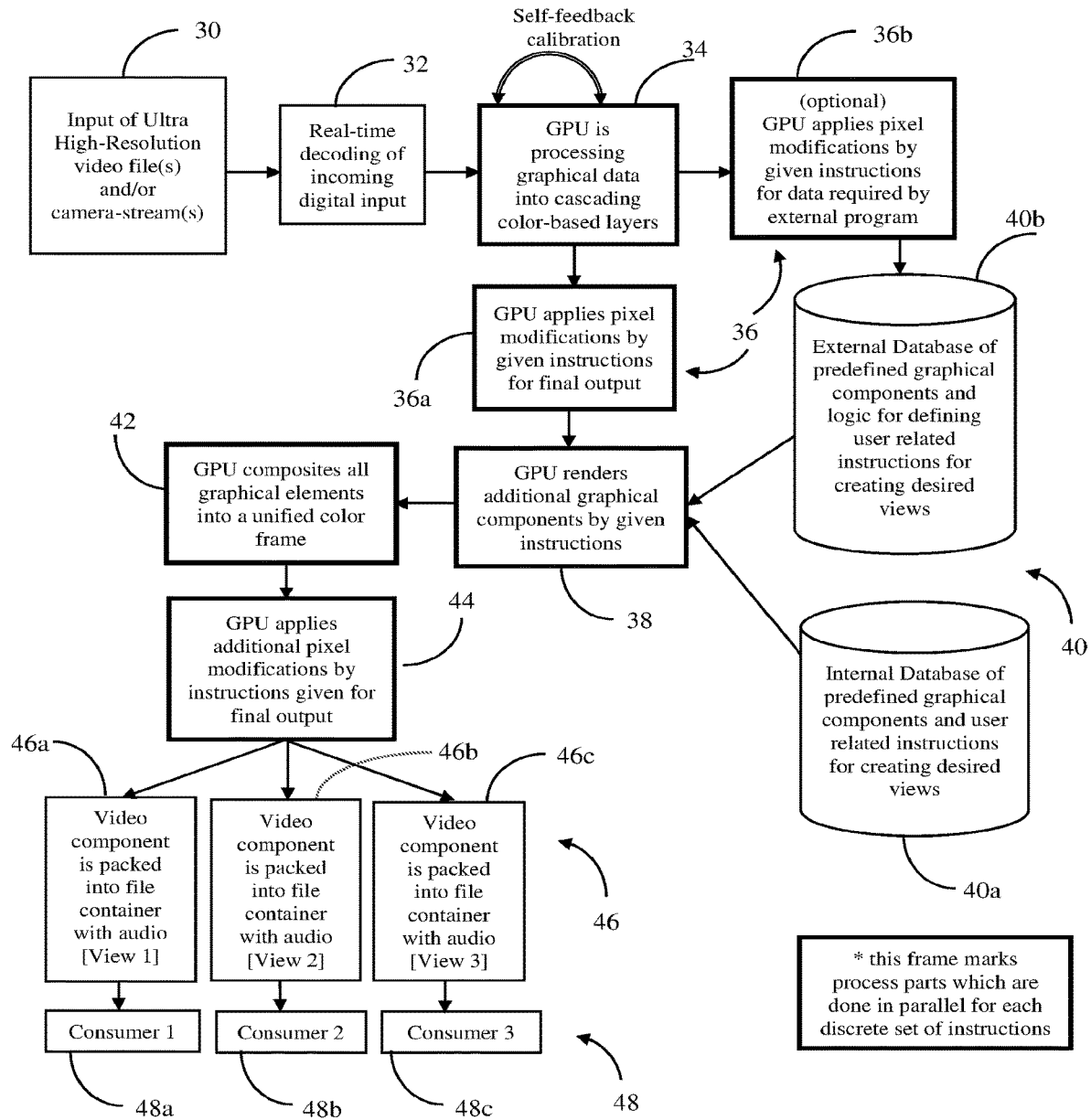
FIG. 2 is an internal process work flow diagram for the system illustrated in FIG. 1 according to some embodiments of the invention.

FIG. 2 illustrates an internal process flow diagram for a system such as shown in FIG. 1 according to some embodiments of the invention. The process begins at 30 with input of a high resolution (HD) video data stream, sometimes referred to as a high definition video file or camera stream, for example, from any of the possible sources mentioned above. At 32, the video file is transcoded from its native format to the internal processing format employed by the system, for example, "raw" video, or alternatively YUV420, RGBA 32 bit.

At 34 GPU 20 is operated to layer each graphical frame into separate preliminary layers according to color. The GPU optionally executes a self-feedback routine by accessing succeeding video frame(s) to tune GPU layer sensitivity. This helps eliminate false detection (light changes, stream quality etc.) Thus, it is preferably employed if the incoming video is a raw stream from a camera (as opposed to video which was post-processed with color calibration and smoothing). In such raw data streams, light artifacts may be present. Weighted average of several consecutive frames enables elimination of such artifacts and subsequent calculation errors.

The program can invite the option to be turned on\off manually by the user or deduced automatically from selection of input (on for live camera and off for video from file). By calculating a weighted average per pixel of colors in a current frame and colors in previous frames, unwanted artifacts such as specks of dust disappear from view.

At 36, two processes proceed in parallel. At 36a, GPU 20 is operated to perform pixel color modifications and, at 36b, if an external computer program requires this, the GPU creates a duplicate of the original video stream and performs initial preprocessing on a duplicate and sends the result to the CPU.

An important feature of some embodiments of the invention is the manner in which the color layer data is provided (between 36b and 40b) from GPU 20 to CPU 22 such that the data is optimized for analysis.

Referring still to FIG. 2, at 38, GPU 20 renders additional graphical elements by instructions generated from CPU 22 for one or more of the preliminary color layers; the instructions are created by the CPU from a predefined program or from data received from an external computer program. The data added to the individual frames is provided by a data storage source 40a containing a database of pre-defined graphical components and user related instructions for creating the desired recipient-specific views, or by an external computer program which combines user-intelligence with a database of graphical components 40b.

At 42, the programming operates GPU 20 to merge the color layers into a composite frame (comprised of the original frame and added graphical components, as described in 38) into a single-layer color frame with uniform resolution. The merging is done with respect to optional transparency of each layer. The act of merging several graphical layers into one, also called "flattening" is known to users of graphical editing software that enables layering, such as Photoshop® and Gimp. The result of the merge done by this invention matches the expectations of those users.

Then, at 44, GPU 20 can apply an addition frame color palette modification to create a unified frame by modifying the color of the frame created in 42. As a result, even though the graphics components come from different sources, i.e. the main video stream and the composed elements, such as other video streams and added graphics (e.g. CGI), they undergo the same specific modifications, and the outcome seems to the observer to have come from a single source.

In computers having sufficiently powerful CPUs, and enough active memory, instead of utilizing the GPU to perform parallel video stream processing, the program can be designed such that the CPU operates in a continuous loop over all the pixels within the frame. This option may be useful where real-time video stream processing is desired, but the incoming video stream has less than HD resolution.

Finally, at 46, GPU 20 renders multiple outputs of new video component streams with respect to intended recipient device resolution. The practice of outputting several resolution streams per video is known in the art. Each of the video component streams is encapsulated into a different file container (three of which are indicated at 46a, 46b, and 46c), which are then made available to intended recipients 48a, 48b, and 48c.

An important feature of some embodiments of the invention is the manner in which different views of the same source video stream are made available synchronously. The software created according to the present invention that provides the real-time synchronization of video streams (whether original or preprocessed) is described in connection with FIG. 3 below.

Figure 3:
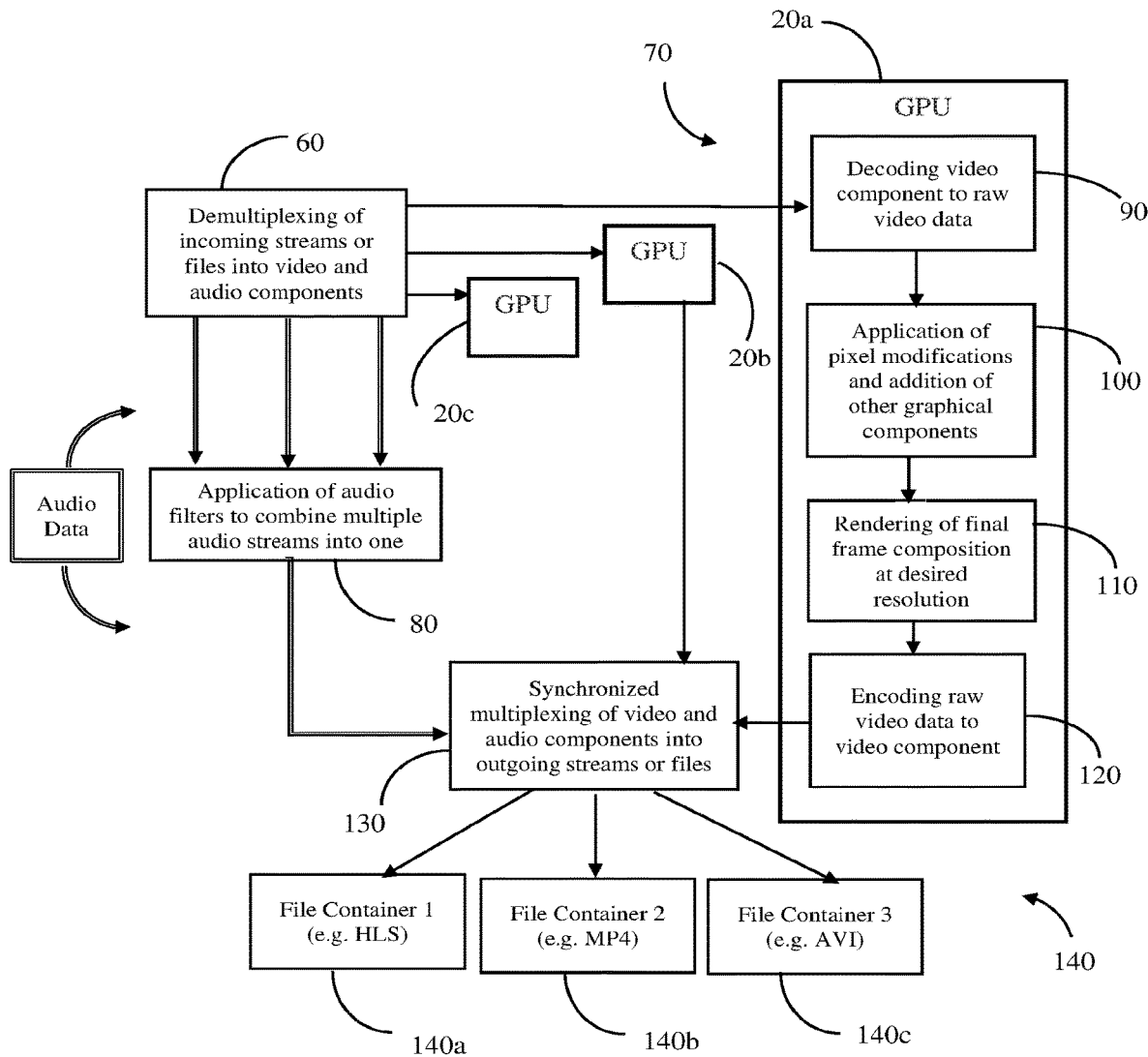
FIG. 3 is a flow diagram of synchronization of views creation according to some embodiments of the invention.

FIG. 3 is a program flow diagram illustrating implementation of the invention according to some embodiments, to synchronize video stream creation, such that any number of video stream which are created from the same source by application of different pixel modifications will display the same base frame at the same time, regardless of performed modifications or processing start time. In considering the following description, it is to be understood that the code defining the program may vary greatly without departing from the concepts of the invention, and that numerous variations of such code will be apparent to those skilled in the art.

Turning now specifically to FIG. 3, at 60, the high-resolution video data is received from an input device such as described above and is demultiplexed into video and audio components. It is to be understood that multiple video streams can be demultiplexed in parallel.

At 70 and 80, two processes proceed in parallel. At 70, video component stream is received by GPU 20, such that a part of GPU internal memory and processing power is dedicated to applying a discrete set of instructions to a video component (three of such parts are indicated at 20a, 20b, and 20c). It is to be understood that when multiple dedicated parts are configured to process the same input source, then graphical frame data is made available to each and all of them at the same time.

At 80, audio component stream or streams are passed through audio filters which combine multiple audio component streams into one. It is to be understood that when only a single audio component stream is passed, it is passed without combination.

At 90, video stream component is decoded from its codec to raw format and is passed as new texture (i.e., color data layers derived from each video frame) for application of various pixel modifications, including addition of graphical components, at 100. Although the preferred embodiment of this invention utilizes GPU 20 to perform decoding, it is understood by those skilled in the art that the decoding can also be done by a CPU 22.

At 110, the final frame is rendered at one or more resolutions and each frame, by resolution, is encoded at 120. Although the preferred embodiment of this invention utilizes GPU 20 to perform encoding, it is understood by those skilled in the art that the encoding can also be done by a CPU 22.

Finally, at 130, video streams and audio streams are multiplexed into one or more file containers (three of which are indicated at 140a, 140b, and 140c), such that each file container contains an audio stream and a video stream which was modified according to initial configuration of the system in relation to this output. It is to be understood that when multiple outputs, which differ in file formats, resolution, and/or pixel modifications, are based on same source inputs, then the outputs are synchronized.

According to the present invention, these technical capabilities are used in a unique way to achieve the enhanced functionality of synchronously creating multiple modified HID video files in real time, i.e., without noticeable delay.

General Interpretational Comments:

Unless otherwise defined, all technical and/or scientific terms used herein have the same meaning as commonly understood by one of ordinary skill in the art to which the invention pertains.

It is to be understood that the invention is not necessarily limited in its application to the details of construction and the arrangement of the components and/or methods set forth in the above description and/or illustrated in the drawings. The invention is capable of other embodiments or of being practiced or carried out in various ways.

The terms "comprises", "comprising", "includes", "including", "having" and their conjugates mean "including but not limited to". The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

The described methods and the required programming can be executed on any computer, which incorporates a suitable central processing unit (CPU) to execute the program, and a GPU in those embodiments for which it is utilized (for high-resolution video streams) to execute the complex frame processing, means for acquiring high-resolution input videostreams, as well as active memory and mass storage, for holding a collection of predefined features.

Implementation of the method and/or system of embodiments of the invention can involve performing or completing some tasks such as selection of intended recipients, manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented on a general-purpose computer suitably programmed as described herein, or as one or more special-purpose chips or circuits, i.e., one or more ASICs.

Although the invention has been described in conjunction with specific embodiments thereof, it is evident that many alternatives and/or modifications and variations will be apparent to those skilled in the art. Accordingly, it is intended to embrace all such alternatives, modifications, and variations that fall within the spirit and broad scope of the appended claims.

What is claimed is:

1. A method of automatically modifying high resolution video data in real time using a computer including a GPU, the method comprising:
   receiving a video data stream by the computer, wherein the video data stream is a high definition stream modified on a frame-by-frame basis, and includes audio data;
   extracting color data for individual pixels of the frames of the video data stream to create color layers;
   cascading the color layers into a unified color map of features in the frame;
   assembling instructions to modify pixels of the frame at a level of the unified color map of features from stored data according to predefined instructions, wherein the instructions at least include additional graphical data to be composited with original graphical data of the video data stream;
   creating multiple modified sets of video data streams according to the instructions, wherein the modified sets of video data are different from each other and the creating includes:
   merging the color layers and the additional graphical data into single-layer color frames, wherein each single-layer color frame is based on a discrete set of the instructions,
   rendering each single-layer color frame based on output resolution requirements to create at least one final frame,
   encoding, based on the resolution, each final frame to at least one codec to create video components, and
   multiplexing the video components with the audio data into desired file formats;
   and making the modified set of video data streams available for access by one or more intended recipients.

2. The method according to claim 1, wherein the video stream is provided by any source and in any native format, including a digital camera, a recorded video file, a streaming video file obtained over a network, and a commercial video program obtained directly off-air.

3. The method according to claim 2 further including decoding the received video data stream from its native format to an internal processing format employed by the computer.

4. The method according to claim 1, wherein the instructions include modifications of color of the original graphical data of the video data stream.

5. The method according to claim 1, wherein the additional graphical data includes other video data from any source and in any native format, and has been decoded, from its native format to an internal processing format employed by the computer by which the method is being performed.

6. The method according to claim 1, wherein the additional graphical data includes images, definitions of 3D models to be rendered by the GPU, and definitions of text to be rendered by the GPU.

7. The method according to claim 1, wherein the instructions transmitted to the GPU include instructions for adding graphical elements.

8. The method according to claim 1, wherein the instructions include storyboard script created prior to processing of the video data stream and read during the processing, and/or commands sent from a human user during the processing.

9. The method according to claim 1, wherein the instructions are generated automatically by a computer algorithm external to the computer performing the method.

10. The method according to claim 1, wherein part of frame or a whole frame, as color layers, is transferred from the GPU to a CPU of the computer for processing by computer vision algorithms and/or a business-intelligence algorithm.

11. The method according to claim 10, wherein the color layers which will be transferred to the CPU for subsequent processing undergo processing by the GPU prior to transfer, to prepare them for external logic application.

12. The method according to claim 10, wherein results of the processing are used to automatically generate the instructions.

13. The method according claim 1, further including executing a self-calibrating routine by accessing succeeding video frames to reduce sensitivity to detection of irrelevant changes in the video data.

14. The method according to claim 1, wherein the instructions for the color layers, including additional graphical elements, are transmitted to the GPU based on stored data for each intended recipient of each modified video stream.

15. The method according to claim 14, wherein the instructions for the color layers include data provided by external systems for each intended recipient of each modified video stream.

16. The method according to claim 1, wherein each frame is modified without introducing visible delays.

17. The method according to claim 1, wherein the multiple modified video data streams are created simultaneously and made available to multiple users.

18. The method according to claim 17, wherein modified video data streams which are based on the original graphical data of the video data stream are synchronized with respect to the video's timeline.

19. The method according to claim 1, wherein the video data stream is characterized by lower than high definition, and the steps of claim 1 are performed by a CPU and active memory of the computer without utilization of the GPU.

20. A computer system for automatically modifying high resolution video data in real time, comprising:
one or more central processing units and/or one or more graphics processing units; one or more network or other communication interface units;
a shared memory including mass storage capability;
wherein the memory contains a program that configures the computer system to:
receive a video data stream, wherein the video data stream is a high definition stream modified on a frame-by-frame basis and includes audio data;
extract color data for individual pixels of the frames of the video data stream to create color layers;
cascade the color layers into a unified color map of features in the frame;
assemble instructions to modify pixels of the frame at a level of the unified color map of features from stored data according to predefined instructions, wherein the instructions include additional graphical data to be composited with original graphical data of the video data stream;
create multiple modified sets of video data streams according to the instructions, output resolution requirements and desired file formats, while original source of the video data stream remains intact, wherein the modified sets of video data are different from each other and the creation includes:
merging the color layers and the additional graphical data of the video data stream into single-layer color frames with uniform resolution, wherein each single-layer color frame is based on a discrete set of the instructions,
rendering each single-layer color frame based on the output resolution requirements to create at least one final frame,
encoding, based on the resolution, each final frame to at least one codec to create video components, and
multiplexing the video components with the audio data into the desired file formats; and
make the modified sets of video data streams available for access by one or more intended recipients.

* * * * *